UNITED STATES PATENT OFFICE.

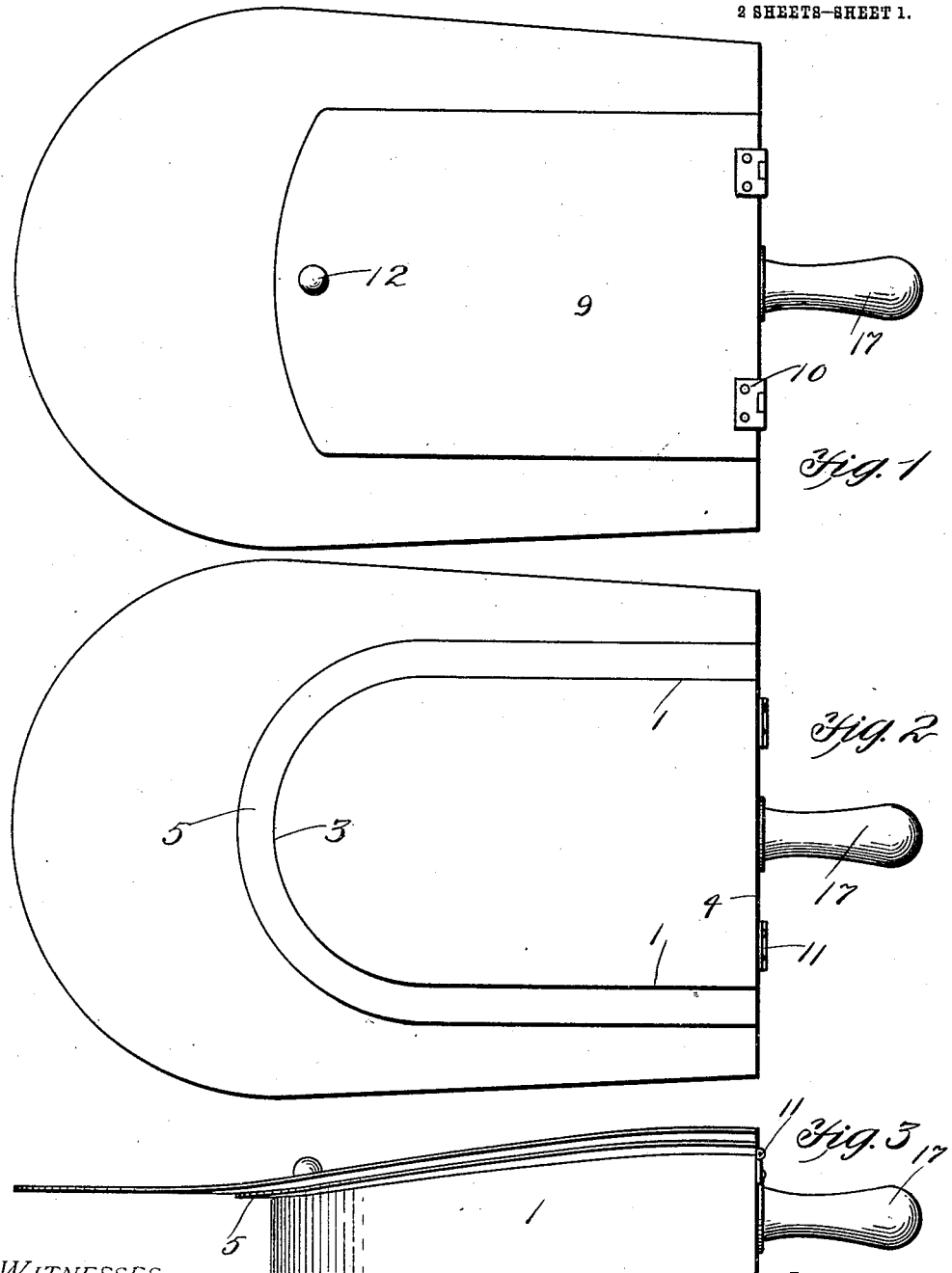

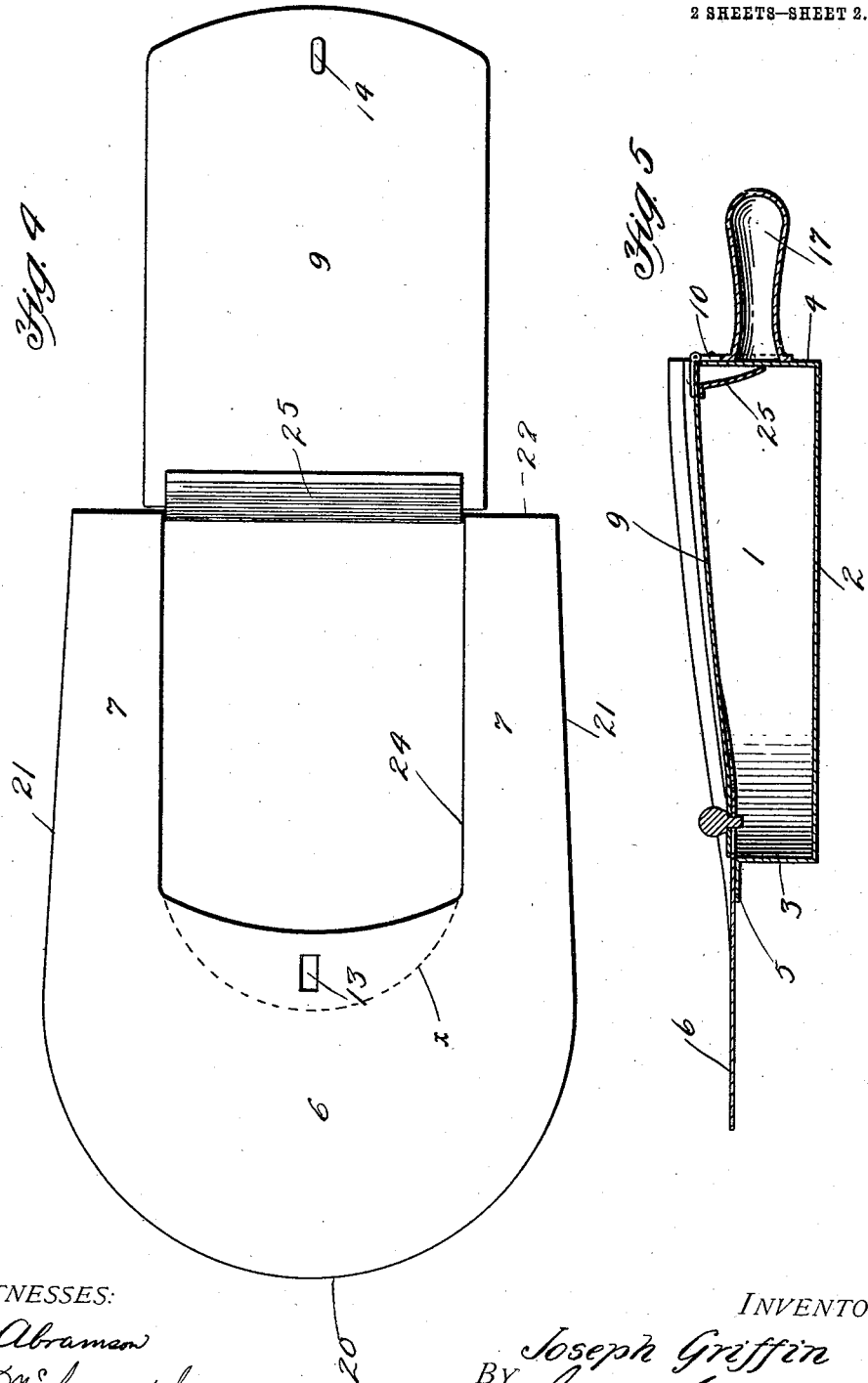

JOSEPH GRIFFIN, OF EAST QUOGUE, NEW YORK; EDWARD C. GRIFFIN ADMINISTRATOR OF SAID JOSEPH GRIFFIN, DECEASED.

BED-PAN.

1,067,423.　　　Specification of Letters Patent.　　Patented July 15, 1913.

Application filed August 17, 1910.　Serial No. 577,649.

*To all whom it may concern:*

Be it known that I, JOSEPH GRIFFIN, a citizen of the United States, and a resident of East Quogue, in the county of Suffolk and State of New York, have invented certain new and useful Improvements in Bed-Pans, of which the following is a specification, reference being had to the accompanying drawings.

This invention relates to improvements in bed pans.

The primary object of my invention is to provide a necessary utensil for the use of persons confined to bed, including a vessel having a projecting or yielding overhanging flange, with a lid to close the opening of the vessel.

Another object is to provide a bed pan with a lid to close the opening thereof, having a spring pressed flange normally in contact with the forward portion of the bed pan.

With these and other objects in view the present invention consists in the combination and arrangement of parts as will be hereinafter more fully described and finally pointed out in the appended claims, it being further understood that changes in the specific structure shown and described may be made within the scope of the claims without departing from the spirit of the invention.

In the accompanying drawings forming a part of this specification, and in which like numerals of reference indicate similar parts in the several views: Figure 1, shows a top view of a bed pan embodying my invention, disclosing the lid as closed. Fig. 2, is a bottom view. Fig. 3, is a side elevational view. Fig. 4, shows a top view disclosing the lid as open. Fig. 5, is a central sectional view.

The aim of my invention is to provide a bed pan with a body supporting flange, which will be yielding within certain limits, so as to comfortably receive the body of the user, the pan being further provided with a lid, so that the same can be securely closed.

In the accompanying drawings, the numeral, 1, designates a side of the vessel forming portion of the pan, 3, the rear, 4, the front, and 2, the bottom of the vessel. The rear, 3, of the vessel, as indicated in Fig. 2, is rounded, the sides, 1, being straight, while the back, 4, is also straight. This vessel is provided with the outstanding flange, 5, which, however, does not form a part of the forward portion, 4.

Secured to the flange, 5, is the shield, 6, having the rounded end, 20, and the straight edges, 21 and 22. This shield, 6, has the opening, 24. As shown, the shield opening, 24, is of a length less than the length of the vessel, the dotted lines, *x*, in Fig. 4, indicating the rear portion of the vessel. Secured to this are the hinges, 10, which carry the lid, 9, having the body, 12, provided with the operating lip, 14, arranged to be inserted into the opening, 13, within the shield, 6, so that the lid can be securely fastened down upon the shield. The lid, 9, is provided with a spring flange, 25, which is normally in contact with the forward portion, 4, of the flange, as shown in Figs. 4 and 5. As disclosed in Fig. 4, the flange, 25, when the lid, 9, is open, rests on the upper edge of the forward portion, 4, while when the lid is closed, as shown in Fig. 5, the flange, 25, works against the inner face of the forward portion, 4, of the bed pan.

As disclosed in Fig. 5, the shield, 6, is slightly flared upward so as to comfortably engage the body of the user. The overhanging portion, 6, as shown in Fig. 5, will bend downward so as to comfortably fit against the back of the user. As disclosed in Fig. 5, the receptacle proper is provided with the operating handle, 17, by means of which the pan may be conveniently handled.

It is, of course, understood that these bed pans are made in various sizes and of any suitable sheet material. The lid, 9, is arranged to be held upon the shield, 6, in air or odortight union. The lid, 9, is also yielding or pliable within certain limits. In use, the lid, 9, rests between the legs of the user and preferably upon the body of the same, the shield, 25, being of spring metal and being normally in contact with the back, 4. In this way the lid, 9, serves as a guard. As shown in Fig. 5, the forward portion, 4, is very much higher than the rear portion, 3, so that the shield inclines from the rear to the front.

A bed pan constructed according to my invention is simple and inexpensive in construction, and both durable and efficient in operation.

Having thus described my said invention, what I claim as new and desire to secure by U. S. Letters Patent, is:

1. A bed pan comprising a vessel inclined from its forward to its rear portion, a shield of yieldable and pliable material, a cover pivoted to the forward edge of the vessel, said shield being of concaved form, the rear edge of the vessel being provided with an outwardly projecting flange, said shield also resting on said flange and edge of the vessel and projecting outwardly thereof at its sides and rear portion and provided with an opening over the vessel closed by said cover and means carried by the free edge of the cover to engage the shield and hold the cover closed.

2. The combination with a vessel of oblong form and having a convexed end and a handle secured to the opposite end; of a shield of yieldable material pivoted to the latter end, said shield having an opening and being movable to extend beyond the sides and convexed end thereof, a portion of the shield overlying the end of the vessel, a cover pivoted to the vessel adjacent the pivot point of the shield and movable over the shield and a spring flange secured to the bottom of the lid transversely of the opening in the shield and curved to engage the adjacent end of the vessel when the lid is closed.

In testimony whereof, I affix my signature, in presence of two witnesses.

JOSEPH GRIFFIN.

Witnesses:
GEORGE W. HILDRETH,
CORNELIA J. HAVENS.

Copies of this patent may be obtained for five cents each, by addressing the "Commissioner of Patents, Washington, D. C."